United States Patent [19]

Otzen

[11] 4,049,551
[45] Sept. 20, 1977

[54] SAFETY DEVICE FOR OPEN RECEPTACLE
[75] Inventor: Karl G. Otzen, Brookfield, Wis.
[73] Assignee: Safety-Kleen Corporation, Elgin, Ill.
[21] Appl. No.: 557,884
[22] Filed: Mar. 12, 1975
[51] Int. Cl.$^2$ .......................... B01D 35/14; E03F 5/14
[52] U.S. Cl. ........................................ 210/163; 4/292;
134/111; 210/167; 210/455
[58] Field of Search ..................................... 4/186–292,
4/150; 134/111; 210/153, 162, 163, 167, 455

[56] References Cited
U.S. PATENT DOCUMENTS

| | | | |
|---|---|---|---|
| 169,551 | 11/1875 | Jones, Jr. ................................. 4/190 |
| 923,270 | 6/1909 | Johnson .............................. 4/292 X |
| 3,522,814 | 8/1970 | Olson ................................... 134/111 |

Primary Examiner—Frank A. Spear, Jr.
Assistant Examiner—R. W. Burks
Attorney, Agent, or Firm—James T. FitzGibbon

[57] ABSTRACT

A safety device for open receptacles adapted for use with flammable solvents and the like. The safety device comprises a unitary piece adapted to be received within the drain opening of a sink or other receptacle in which parts and mechanical components are temporarily received for cleaning by passage of solvent thereover. The device includes a locating flange, and a wall which subdivides the receptacle drain opening into an ordinary flow path and a second opening. The wall also defines an alternate drain flow path between other portions of the receptacle interior and the drain opening. The alternate flow path to the secondary drain is preferably defined by a contoured wall which cooperates with the interior surfaces of the receptacle to define a drain path for solvent which can flow through the principal drain path. This wall contains a large number of openings so that accidental or even intentional blockage of the drain path cannot be readily accomplished. Accordingly, the possibility of unsafe accumulation of a solvent in the receptacle is greatly reduced and the safety hazard occasioned thereby is eliminated or minimized.

3 Claims, 5 Drawing Figures

U.S. Patent     Sept. 20, 1977     4,049,551
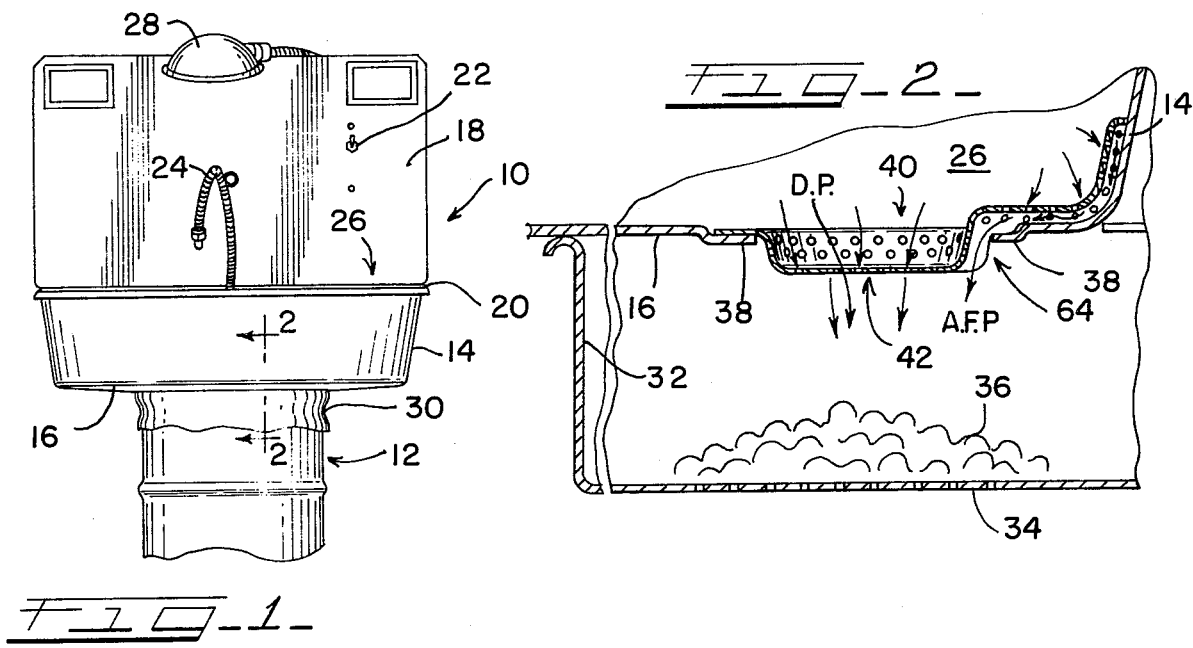
FIG-1
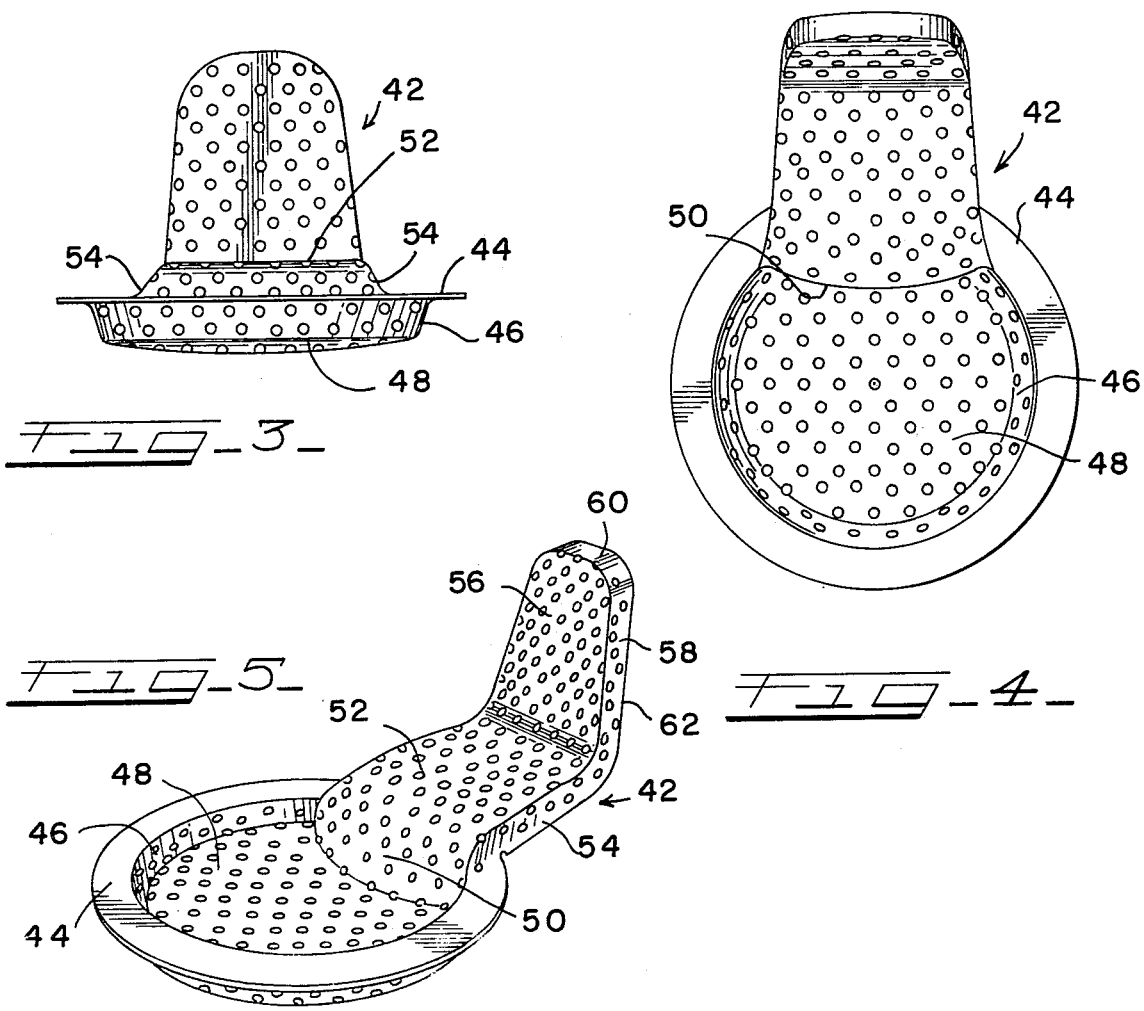

SAFETY DEVICE FOR OPEN RECEPTACLE

BACKGROUND OF THE INVENTION

The present invention relates to safety devices, and more particularly, to a combination drain opening screen and alternate drain path element for a sink or other liquid receptacle associated with a liquid reservoir. One form of the device is intended to insure that flammable solvents will not accumulate in significant quantities in an open or exposed receptacle as a result of accidental drain blockage.

Within the last few years, widespread use has been made of parts washers or cleaners which utilize a remote solvent reservoir, and a parts receiving sink or other receptacle into which a solvent conduit extends. A solvent pump is provided to pick the solvent up in the reservoir, force it through the conduit and onto an array of parts being washed in the sink. This provides a steady stream of solvent for washing action which may be carried out alone, or which may be aided by the use of a brush or other instrument manipulated by the operator. Parts washers of this type customarily have a cover unit for the receptacle or sink which is hingedly mounted and disposed atop the receptacle, where it is held in an open position by a fusible link. Accordingly, in the event of a solvent fire, the fusible link will melt, and the receptacle cover will fall under the force of gravity to cover the sink in an airtight manner, thus extinguishing the fire.

In parts washers of this type, one form of which is illustrated in U.S. Pat. No. 3,522,814, and in other types of parts washers, the sink or other receptacle is intended to be kept free of solvent unless the pump is operating. Constructions of this type are made, and are recommended by safety authorities, because there is minimal exposure of solvent to the atmosphere. In other words, the liquid solvent is kept in the reservoir, and the reservoir is separated from the sink by a relatively small drain opening which is customarily partially closed off by a screen or so-called crumb cup. As long as the circulating pump is shut off, the sink is drained by gravity and solvent returns to a relatively safe place of storage.

Safety authorities and organizations are reluctant to endorse any construction wherein a large surface area of solvent is presented to the atmosphere, inasmuch as such large surface area presents a large evaporation potential and a correspondingly great fire hazard. Nevertheless, some workers using parts cleaners or washers of this type wish to soak articles to be cleaned in a solvent rather than taking the trouble to direct the stream of solvent onto the parts to insure proper cleaning. Accordingly, such parts washers users intentionally plug the receptacle or sink drain, as with a rag, for example, so that a certain volume of solvent will accumulate in the sink.

In other instances, a rag used by an operator may inadvertently plug the drain and thereby cause the solvent to accumulate in the sink. Thus, whether the sink drain is plugged accidentally or intentionally, and whether or not the operator is aware of the situation, a sink containing a significant volume of solvent constitutes a definite safety hazard to the worker, to other co-workers, and to the premises wherein the apparatus is being used.

Accordingly, in order to prevent personal injury or property damage arising from fire or explosion, there has been a need for a parts washer having means to insure that the solvent does not inadvertently collect any significant quantities in the parts receptacle portion of the parts washer unit. There has been a further need for designing a parts washer drain system which will tend to insure against both accidental and deliberate drain blockage.

There has been a further need for a relatively foolproof drain system which can be accomodated entirely within existing sinks or other receptacles without modification to the receptacle, and particularly, without the necessity of having parts or components lying outside the sink or other receptacle to achieve satisfactory performance from the standpoint of safety.

In view of the foregoing, it is an object of the present invention to provide an improved safety device for a solvent receptacle.

Another object is to provide a drain element for a receptacle which provides at least two drain paths, one of which is normal always in use and which communicates directly with the liquid sump or reservoir, and another of which extends away from the first element and provides an alternate drain flow path and a plurality of access openings to such path.

Another object is to provide a safety device comprising a combination strainer or small parts retainer and drain unit which includes portions cooperating with and engaging the receptacle so as to define a liquid flow path having plural access openings thereto.

Still another object is to provide a safety drain device and strainer combination which includes a direct fluid drain path and means defining a second drain path, with the second drain path extending both generally horizontally and generally vertically so as to provide plural regions of fluid pickup.

A still further object is to provide a combination strainer or small parts retainer and safety drain device which is contoured so as to resist even intentional attempted blockage thereof.

Still another object is to provide a safety drain device which includes plural openings communicating with an alternate drain path lying at various levels within the receptacle and at various distances from the periphery of the receptacle drain opening.

Another object is to provide a safety device of the above character which is of unitary construction and capable of simple and economical manufacture.

A still further object is to provide a safety drain device which will lie entirely within a safety receptacle so that a safety drain feature may be imparted to an existing receptacle without modifying the receptacle itself.

The foregoing and other objects of the invention, including certain inherent objects and advantages are achieved by providing a combination screen and drain element adapted for reception in a drain opening and including means with one portion thereof screening off a part of the existing drain path opening and having another portion defining both an alternate flow path and a plurality of access openings thereto, whereby fluid may flow from the receptacle to an associated drain or sump through one part of the screen unit, and wherein fluid may also flow by another path through the access opening and into the sump.

The exact manner in which these objects and advantages are carried into practice will become more clearly apparent when reference is made to the following detailed description of the preferred embodiments of the invention set forth by way of example, and shown in the accompanying drawings, wherein like reference numbers indicate corresponding parts throughout the serveral figures.

BRIEF DESCRIPTION OF THE DRAWINGS

FIG. 1 is a front elevational view showing a parts washer of the type in which the safety device of the invention may be used;

FIG. 2 is a vertical sectional view of a part of the parts washer of FIG. 1, taken on an enlarged scale and showing the combination screen and drain element in position of use within the receptacle;

FIG. 3 is a front elevational view of the combination safety device of the invention, taken on a further enlarged scale;

FIG. 4 is a top plan view of the safety device of the invention; and

FIG. 5 is a perspective view of the combination device of the invention.

DESCRIPTION OF THE PREFERRED EMBODIMENTS OF THE INVENTION

Although it will be understood that the safety device of the invention is capable of use within a number of types of sinks or other receptacles, a description will be made herein of a form of apparatus used in a sink having slightly tapered but generally relatively vertical side and end walls and a relatively horizontal bottom surface. By "relatively" in the foregoing expression, and in the claims, is meant surfaces corresponding to the end and side walls and bottom walls, respectively, of sinks which may in fact have sufficient pitch in their bottom surfaces to insure drainage through one or more drain openings therein (whether these be located centrally or otherwise) and the end and side walls being inclined sufficiently to provide easy cleaning thereof, easy manufacture and pleasing appearance.

Referring now to the drawings in greater detail, FIG. 1 shows a parts washer assembly generally designated 10 to be removably or otherwise received over means in the form of a barrel 12 for receiving and storing a quantity of solvent. The parts washer 10 is shown to include a sink 14 having a bottom surface 16 and a safety cover 18 hingedly mounted and held above the top edge 20 of the sink 14 by a fusible link 22. FIG. 1 shows that a flexible conduit 24 lies partially within the sink and is adapted to direct the solvent pumped from the reservoir formed by the barrel 12 into the interior 26 of the sink 14. Customarily a light 28 illuminates the sink interior 26, and the barrel 12 includes a lining in the form of a plastic bag 30.

FIG. 2 shows that a flanged sink support and locating cylinder or sleeve 32 is disposed beneath the lower surface 16 of the sink 14, and that a perforated bottom wall 34 supports a mass of filter material 36 thereon.

An inner marginal offset flange 38 in the bottom wall 16 of the sink 14 defines an opening 40 in which the safety device 42 of the present invention is received in use.

In the preferred form shown, the safety device 42 includes supporting and locating means in the form of a generally horizontally extending flange 44 which is of interrupted circular form in plan view (FIG. 4). Disposed inside the flange 44 is a downwardly extending, perforated wall 46 which, in combination with the bottom wall 48 and a second downwardly extending wall 50, defines a strainer cup adapted to retain small parts and provide a screen for the principal drain path between the interior 26 of the sink 14 and the solvent reservoir 12 and/or the sleeve 32 associated therewith. In other words, the perforated walls 46,48,50 partially screen the drain path defined by the opening 40 in the bottom wall 16 of the sink 14.

FIGS. 3 to 5 also show that the safety device 42 includes, in addition to the wall 50, a generally horizontally extending, perforated housing portion defined by top wall and side wall portions 52,54, respectively. The safety device 42 further includes a generally vertically extending housing portion in turn comprised of perforated front, side, and end wall portions 56,58,60, respectively. The generally downwardly and outwardly directed edge portion 62 of the device 42 is shown to have a contour complementary to that of the inside surface of the sink 14, so that the edge 62 lies on or closely adjacent the bottom wall of the sink in its horizontal extent, closely along the vertical wall in its vertical extent and along the curvilinear transition surface of the sink joining the generally horizontal and vertical positions to each other.

From the foregoing, it will be noted that the various surfaces 50–60, and the edge 62 cooperate with the inside surfaces of the sink 14 to define an alternate flow path through which fluid received in the sink may pass on its way to the barrel 12 or other solvent reservoir. As shown by the small arrows in FIG. 2, while solvent will normally flow through the openings 46,48 in the cup by direct downward passage, such solvent may also flow through the openings in the members defining the alternate flow path, and thence along this path into the reservoir. It will be understood that fluid following this path will pass through the opening 64 inside the sink flange 38 rather than through the bottom side or surfaces 46,48 of the cup screening the opening 40.

From a consideration of FIGS. 3 to 5 it will be seen that the combination of a large number of openings disposed in various planes and at various heights and angles, and the generally compound or multi-axis contour of the surfaces defining the alternate flow path makes difficult or impossible accidental clogging of all drain openings. This, the surface 50 is contoured oppositely from the surfaces 46. The surface 52 is slightly curved in front elevation and the walls 54 include plural openings on different levels. The walls 56 and 58 provide still further openings serving as access to the alternate drain path. The wall 60 may also include one or more additional openings to the alternate flow path leading from the interior from the sink 14 to the barrel 12.

Because of their generally vertical disposition, rags or other loose material will not normally lie closely along the surfaces 56,58 so as to close off the flow path. Likewise, while placing a generally flat rubber mat or a rag over the drain opening 40 may effectively close off openings in the walls 46,48, solvent can nevertheless flow along one or more of the surfaces 58,54 and through the openings therein to the alternate flow path. The safety device will thus be seen to provide so many surfaces of such varied contours and levels that blocking all of the openings therein, and particularly doing so accidentally, would be virtually impossible.

An important adavantage of the device is that, unlike other sink drains in the form of a standpipe or the like, the device does not interfere with normal use of the sink. Moreover, the openings are placed at so many closely adjacent levels that, unlike a standpipe type safety device, the liquid need not reach a predetermined level for the drain to be operative.

Still further, the contour of the device is such that it can be used with existing sinks because the edge 62 lies along the sink surfaces so as to utilize such surfaces to define a part of the alternate flow path. It therefore normally keeps the sink entirely free of solvent.

The large plurality of small openings provides a screen effect for fire safety purposes, and also prevents small parts, which might float or be suspended within the liquid, from passing through a larger drain opening.

The safety device of the invention can be readily removed for servicing the parts washer if desired, or may be permanently installed as an additional safety feature. The device depends for its operation only upon the existence of a sink with a drain opening and does not require cooperation with elements of a parts washer, other than the sink itself, in order to be completely effective.

Very importantly, the safety device of the invention may be directly substituted for strainer elements ("crumb cups") already in use on existing parts washers, and does not require modifications to the sink such as changes involving the formation of openings in the sink or the creation of passages lying outside the sink. In other words, the alternate drain path is highly effective and yet lies entirely within the interior of the sink.

A preferred construction of the device has been shown incorporating a single, generally horizontal leg and a generally vertical leg. It will be understood, however, that one or more additional legs, or more or further contoured surfaces might be provided it this seems desirable.

The illustrated embodiment is preferably made of a single piece of sheet metal which has been previously perforated and from which the final part has been stamped or drawn. However, it will be understood that the device may be made of other or different materials, and that the size and shape of the openings are not critical features of the invention. Thus, for example, the entire device or parts thereof, might equally well be made partially or entirely of screen or mesh material, particularly where great rigidity and mechanical strength are not required. Other modifications of the invention will also be apparent to those skilled in the art.

It will thus be seen that the present invention provides a novel combination screen for a drain opening and alternate drain path for a liquid receptacle, said device having a number of advantages and characteristics, including those referred to specifically herein, and others which are inherent in the invention. It is anticipated that, a representative embodiment only having been shown by way of example, various modifications and changes to the form of the device described will occur to those skilled in the art, and such changes may be made without departing from the spirit of the invention or the scope of the appended claims.

I claim:

1. A safety device adapted for freely removable reception in the drain outlet opening of a liquid receptacle having a generally horizontally extending bottom wall portion, a drain outlet opening therein, and generally vertically extending side wall portions, said safety device including means for locating said device within said outlet opening, a generally horizontally extending, perforated first wall portion lying parallel to the plane of said drain outlet opening, said first wall portion providing a direct drain path from said receptacle interior, and a second wall portion cooperating with said receptacle walls to define an alternate drain flow path from said receptacle interior, said second wall portion being contoured so as to include a first part attached to and extending generally upwardly from said first wall portion, a second part lying generally parallel to said bottom receptacle wall and a third part lying generally parallel to at least one of said receptacle side walls, said second and third parts of said contoured wall including marginal portions with edges adapted to engage said bottom and side walls respectively, said contoured wall further including a plurality of openings in each of said parts thereof, said openings providing plural paths of communication between said receptacle interior and said alternate drain flow path-defining means.

2. A safety device as defined in claim 1, wherein said device is made from a relatively rigid, fire-proof material.

3. A safety device for freely removable reception in the drain opening of a solvent receptacle, said device including a generally horizontally extending mounting flange portion adapted to overlie the margins of said receptacle defining said opening, a perforated screening wall lying below said flange and being offset therefrom, an offsetting, perforated flange joining said mounting flange to said screening wall, a wall at least partially defining an alternate flow path to said opening, said wall including portions joined to said offsetting flange and said screen portion and extending between spaced apart portions of said mounting flange, generally horizontally and generally vertically extending wall portions joined to each other, generally vertically and horizontally extending margins attached respectively to said horizontally and vertically extending wall portions, edges of said margin being adapted to lie along said receptacle walls, with said horizontally and vertically extending wall portions being perforated, whereby said drain opening is subdivided into a first solvent outlet portion screened by said perforated screening wall and a second solvent outlet portion communicating with the path defined by said horizontally and vertically extending wall portions.

* * * * *